United States Patent
Bowers

[11] 3,987,869
[45] Oct. 26, 1976

[54] BACK PACK LUBRICATION SYSTEM

[76] Inventor: George Keith Bowers, 1533 Larkspur Ave., Eugene, Oreg. 97401

[22] Filed: Aug. 14, 1975

[21] Appl. No.: 604,552

[52] U.S. Cl. .................... 184/105 R; 222/175; 224/5 W; 184/27 R
[51] Int. Cl.² .................................... F01M 11/04
[58] Field of Search ............... 184/105, 1.5, 105 R, 184/105 A, 105 C, 27 R; 222/175; 224/5 W, 5 BC; 239/653; 417/321

[56] References Cited
UNITED STATES PATENTS

| | | | |
|---|---|---|---|
| 1,339,237 | 5/1920 | Thompson | 184/105 A |
| 2,430,608 | 11/1947 | Ginter | 184/1.5 |
| 2,507,315 | 5/1950 | McCain | 417/321 |
| 2,684,787 | 7/1954 | Charpiat | 224/5 W |
| 2,767,885 | 10/1956 | Miller | 222/175 |
| 3,095,123 | 6/1963 | Smith | 222/175 |
| 3,146,723 | 9/1964 | Wildhaber | 417/321 |

Primary Examiner—Richard C. Pinkham
Assistant Examiner—Marvin Siskind
Attorney, Agent, or Firm—James D. Givnan, Jr.

[57] ABSTRACT

A lubrication system including a base with shoulder straps. A motor pressurizes grease received from cylinders having spring urged pistons. The pressurized grease is discharged by a grease gun at the end of a grease hose with a grease gun mounted switch controlling motor operation. The grease cylinders are removably mounted on the base by brackets and straps.

4 Claims, 5 Drawing Figures

BACK PACK LUBRICATION SYSTEM

BACKGROUND OF THE INVENTION

The present invention relates generally to lubrication equipment and particularly to such equipment for use by those lubricating heavy equipment either at a plant site or in the field.

Portable lubrication equipment for the most part is embodied within hand-held devices including a lubricant reservoir, means for pressurizing the lubricant therein and a grease conduit with a coupling at its distal end for sealed engagement with a grease fitting. Such devices are referred to generally as grease guns. Another type of grease gun relies upon pressurization of lubricant container remote from the hand-held grease gun. The container is wheel-supported and pressurized by air rendering same dependent on a close by pressure source. With regard to grease guns having a self-contained supply of lubricant, the lubricant capacity is usually limited to 20 or less ounces of grease which while suitable for some lubrication jobs is not practical when lubricating several large pieces of industrial equipment. It is not uncommon for a workman to spend considerable time in reloading of the grease gun one or more times during a work shift. Another drawback to such grease guns is the fact that those used for industrial purposes require two-handed operation. As many lubrication points on large pieces of equipment can only be reached with the use of a ladder, the risk of injury by a fall during servicing of a fitting is greatly increased. With respect to lubrication systems having an air-pressurized, wheel-supported cylinder the same are not in any way practical for use within an industrial facility by reason of their restricted mobility.

SUMMARY OF THE PRESENT INVENTION

The present invention is embodied in a lubrication system conveniently transported on the user's back and having an extended supply of lubricant.

A backboard constitutes a base on which system components are mounted which components include grease cylinders removably mounted on the base. Each of said cylinders is in discharge communication with a pump housing wherein motor-driven means pressurizes the lubricant for passage through a hose to a grease gun. A motor driving through speed reduction means is in circuit with a power source mounted on said base with control switch means actuated by a grease gun trigger. Accordingly, motor operation as controlled by said switch results in selective pressurization of the grease with no strenuous physical effort on the worker's part.

Important objects of the present invention include: the provision of a lubrication system transportable on the user's back and having an extended supply of lubricant much greater than known lubrication grease guns; the provision of a lubrication system wherein large capacity grease cylinders initially pressurize the lubricant for flow into a pump housing whereat powered pressurizing means serves to further pressurize the lubricant; the provision of a lubrication system wherein an electrical motor driving through a suitable gear reduction system powers grease pressurization means with motor control provided by a switch located within the grease gun; the provision of a lubrication system wherein a grease cylinder is readily disengageable from the pump housing and from the base component of the system for purposes of recharging the cylinders with a lubricant; the provision of a lubrication system using an auger for pressurization of grease.

DETAILED DESCRIPTION OF THE PREFERRED EMBODIMENTS

Figure 1:
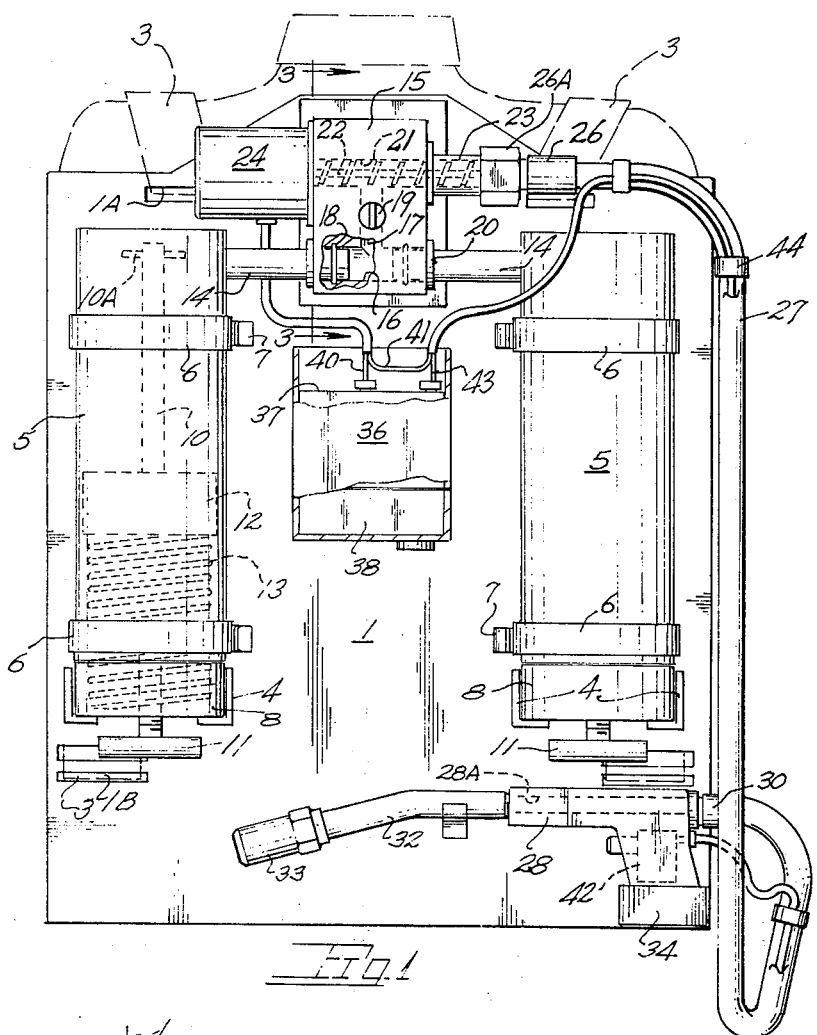
FIG. 1 is an elevational view of the present system in place on the back of a workman.
Figure 2:
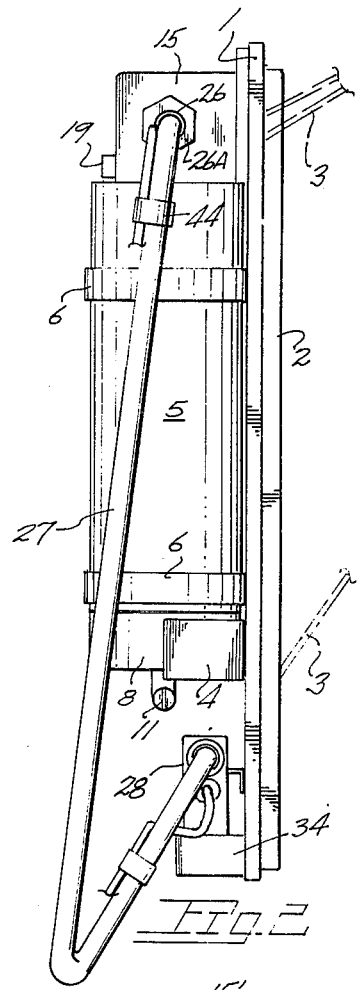
FIG. 2 is a side elevational view of the righthand side of FIG. 1.
Figure 3:
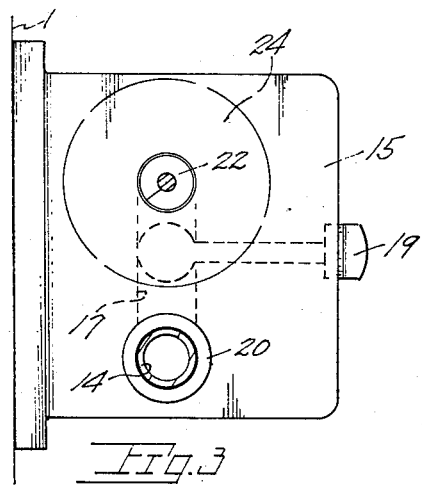
FIG. 3 is a view taken along line 3—3 of FIG. 1 showing pump housing details.

With continuing reference to the accompanying drawing wherein applied reference numerals indicate parts similarly identified in the following description, the reference numeral 1 indicates a rigid base on which a resilient layer or pad 2 is affixed, the latter constituting padding to space the base from a user's back. Base 1 may be of plywood or light-weight metal with padding 2 of resilient urethane foam provided with a durable cover suitably secured to said base. A pair of shoulder straps 3 are secured at their upper and lower limits within upper and lower pairs of openings 1A–1B in said base and are adjustable in the conventional manner.

Pairs of brackets are indicated at 4 which are secured to base 1 and, being of angular nature, support grease cylinders at 5. Cooperating with said brackets to retain the cylinders are metal straps 6 each provided with a buckle 7.

With continuing attention to the grease cylinders, each cylinder includes a cap 8 in threaded engagement with the cylinder lower end. A rod shown typically at 10 extends the length of the cylinder and terminates outwardly thereof in a handle 11. Internal cylinder structure is similar to existing manually pressurized grease cylinders wherein a spring-biased piston pressurizes grease for discharge into a second chamber whereat further pressurization occurs. Such cylinders also include a control rod for retracting the piston in abutment with the cap during a grease reloading operation.

In the present grease cylinder a piston at 12 is acted upon by a spring 13 for urging cylinder contents outwardly via conduit means 14. Piston control rod 10 serves to retract piston 12 compressing spring 13 against cap 8 during cap removal and replacement subsequent to recharging of the cylinder with grease. A crosspiece 10A at the rod inner end abuts the piston during retraction while forward extension of the rod, after cap replacement, is permitted by reason of the sliding fit between the rod and piston. Further, rod 10 is threaded at its lower end for stowed attachment to cap 8.

A pump housing, indicated at 15, is mounted on base 1 and defines a transverse bore 16 and a communicating upright bore 17. O-rings at 18 seal the inserted ends of conduit means 14 within the pump housing with collars 20 additionally affecting a seal. A second transverse bore at 21 in the pump housing receives grease pressurizing means in the form of an auger 22 which extends outwardly therefrom within an auger tube 23.

A butterfly shut-off valve 19 permits closure of bore 17. A motor at 24 includes a gear reduction drive within its motor case and is suitably secured to said pump housing. The drive output shaft (unseen) is coupled with the auger shaft to drive same causing auger flights to compress lubricant forced into transverse bore 21 by the action of piston 12.

Removably coupled to the outer end of auger tube 23 is a hose coupling 26 which may include an internally threaded member 26A in threaded engagement with said tubes. A collar portion of said coupling secures one end of a grease hose 27 which terminates oppositely in communication with a grease gun 28. Hose 27 is attached to the grease gun via a suitable coupling 30 to provide a pressurized flow of grease through a passageway 28A and through an extension tube 32 attached to said gun. A coupling 33 on said extension tube embodies internal structure enabling sealed engagement with a grease fitting on the equipment being lubricated. Obviously extension tube 32 as well as coupling 33 may be interchangeable with similar components to best suit the task at hand. A grease gun holder at 34 provides for convenient storage of the gun on base 1 in an accessible manner.

Indicated at 36 is a case for a rechargeable power pack 37 serviced by a recharging unit 38 to enable the power pack to be recharged in between work shifts from any 120-volt service outlet. Motor 24 may be of a 12 volt rating in circuit via a lead 49 with the power pack while the remaining side of the circuit includes a lead 41 terminating at a normally open switch 42 located within grease gun 28. Switch 42, upon actuation by a finger of the operator, closes the above-described circuit to the negative side of the power pack via a conductor 43. To reduce the possibility of entanglement, the lead 41 and conductor 43 are routed along the grease hose 27 by means of clips at 44.

Figure 4:
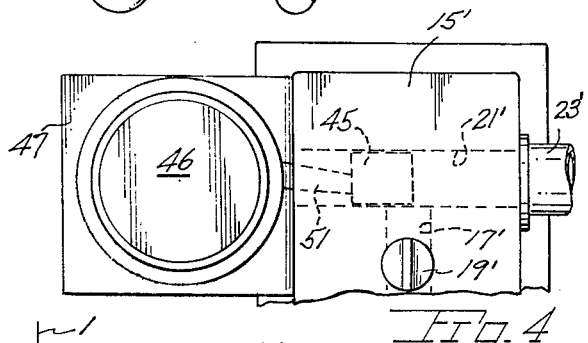
FIG. 4 is a fragmentary elevational view of a pump housing incorporating a modified form of grease pressurizing means.
Figure 5:
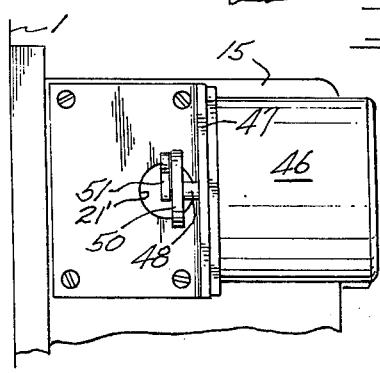
FIG. 5 is a lefthand elevational view of FIG. 4.

In FIGS. 4 and 5 a modified form of lubricant pressurization means is disclosed wherein a piston 45 reciprocates within a bore 21' of a pump housing 15'. A motor 46 is mounted to the pump housing by means of a bracket 47. An output shaft 48 of a gear reduction drive powered by said motor drives an eccentric 50 to which is pivotally mounted an outer end of a pitman 51 driving piston 45. During each return stroke of piston 45 a quantity of lubricant enters bore 21' from communicating bore 17' and thereafter pressurized for passage through a tube 23' and a grease hose. A valve 19' blocks flow within bore 17'.

In operation of the present system fully charged cylinders are strapped into bracket-supported engagement with base 1 with their conduit means 14 slidably inserted with bore 16 of pump housing 15. Piston control rods 10 are then repositioned upwardly to permit piston 12 to be biased upwardly by spring 13 to discharge their combined flows into pump housing 15 for pressurization by auger 22 or piston 45 in the modified form. Upon seating engagement of grease coupling 33 with a machine grease fitting, the operator closes normally open switch 42 to energize motor 24 whereupon the lubricant within hose 27 is pressurized to propel lubricant past the fitting to the machine bearing. As grease is substantially non-compressible, cessation of motor operation will terminate discharge of grease from grease gun coupling 33. If so desired a grease coupling having an internal valve arrangement may be utilized to positively seal coupling 33 upon disengagement from a fitting. Such a coupling is shown and described in U.S. Pat. No. 3,788,427.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A back pack lubrication system comprising in combination,
   a base adapted for transport on the back of an operator,
   lubricant cylinders including conduit means for discharging cylinder carried lubricant,
   means removably mounting said cylinders to said base,
   lubricant pressuring means on said base including,
     a motor in electrical circuit with a power source on said base,
     lubricant pressurizing means driven by said motor,
     a housing receiving lubricant from said cylinders and directing same to said pressurizing means,
   said conduit means of the cylinders in detachable sealed engagement with said housing permitting cylinder disengagement for refilling purposes, and
   a grease gun served by a hose in communication with said housing and including switch means in circuit with said motor for actuation by the operator to close the motor circuit to pressurize lubricant within said hose and gun.

2. The lubrication system claimed in claim 1 wherein said mounting means includes straps and cooperating brackets affixed to said base.

3. The lubrication system claimed in claim 1 wherein said lubricant pressurizing means comprises an auger.

4. The lubrication system claimed in claim 1 wherein said lubricant pressurizing means comprises a reciprocated piston.

* * * * *